(12) United States Patent
Barada et al.

(10) Patent No.: US 6,404,088 B1
(45) Date of Patent: Jun. 11, 2002

(54) MAGNETIC BEARING DEVICE

(75) Inventors: Toshimitsu Barada, Tokyo; Atsushi Ooyama, Fujisawa; Toshiharu Nakazawa, Chigasaki, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/657,067

(22) Filed: Sep. 7, 2000

(30) Foreign Application Priority Data

Sep. 7, 1999 (JP) .......................................... 11-253184

(51) Int. Cl.$^7$ ................................................ H02K 7/09
(52) U.S. Cl. .................................... 310/90.5; 310/68 R
(58) Field of Search .......................... 310/90.5, 68 R, 310/80, 103–105; 417/423.12, 420; 415/118, 900; 483/7, 31; 409/231; 451/342; 318/611, 623, 632, 629; 361/144

(56) References Cited

U.S. PATENT DOCUMENTS

| | | | | |
|---|---|---|---|---|
| 5,013,987 A | * | 5/1991 | Wakui | 318/632 |
| 5,027,280 A | * | 6/1991 | Ando et al. | 310/90.5 |
| 5,093,754 A | * | 3/1992 | Kawashima | 361/144 |
| 5,247,219 A | * | 9/1993 | Nakagawa et al. | 310/90.5 |
| 5,256,952 A | * | 10/1993 | Yoneyama et al. | 318/629 |
| 5,666,013 A | * | 9/1997 | Mizuno | 310/90.5 |
| 6,015,275 A | * | 1/2000 | Suzuki et al. | 417/423.12 |
| 6,208,051 B1 | * | 3/2001 | Ando | 310/90.5 |

FOREIGN PATENT DOCUMENTS

| | | |
|---|---|---|
| DE | 41 14566 A1 | 5/1991 |
| JP | 9-72336 | 3/1997 |
| JP | 10-37957 | 2/1998 |
| JP | 10-179730 | 7/1998 |
| JP | 11-166534 | 6/1999 |
| JP | 11-166535 | 6/1999 |
| JP | 11-303869 | 11/1999 |

* cited by examiner

*Primary Examiner*—Tran Nguyen
(74) *Attorney, Agent, or Firm*—Armstrong, Westerman & Hattori, LLP

(57) ABSTRACT

A magnetic bearing device has an object levitated in an arbitrary position between confronting electromagnets. Positional displacement sensors detect a positional displacement of the object. When the electromagnets are successively energized, the object is moved in a mechanically movable maximum range between the electromagnets, and maximum and minimum values of a detected positional displacement signal from the positional displacement sensors are detected. A middle value between the maximum and minimum values is calculated and compared with a threshold level. An adjustment signal is applied to an offset corrector which produces an offset-corrected signal from the detected positional displacement signal, so as to substantially eliminate the difference between the middle value and the threshold level so that the middle value represents a position in which the object is to be levitated between the electromagnets.

3 Claims, 3 Drawing Sheets

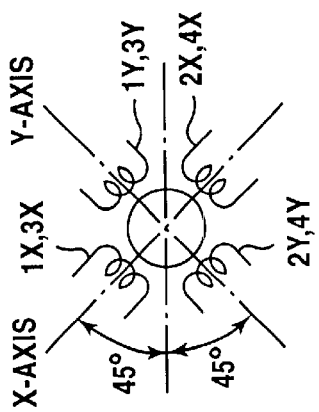
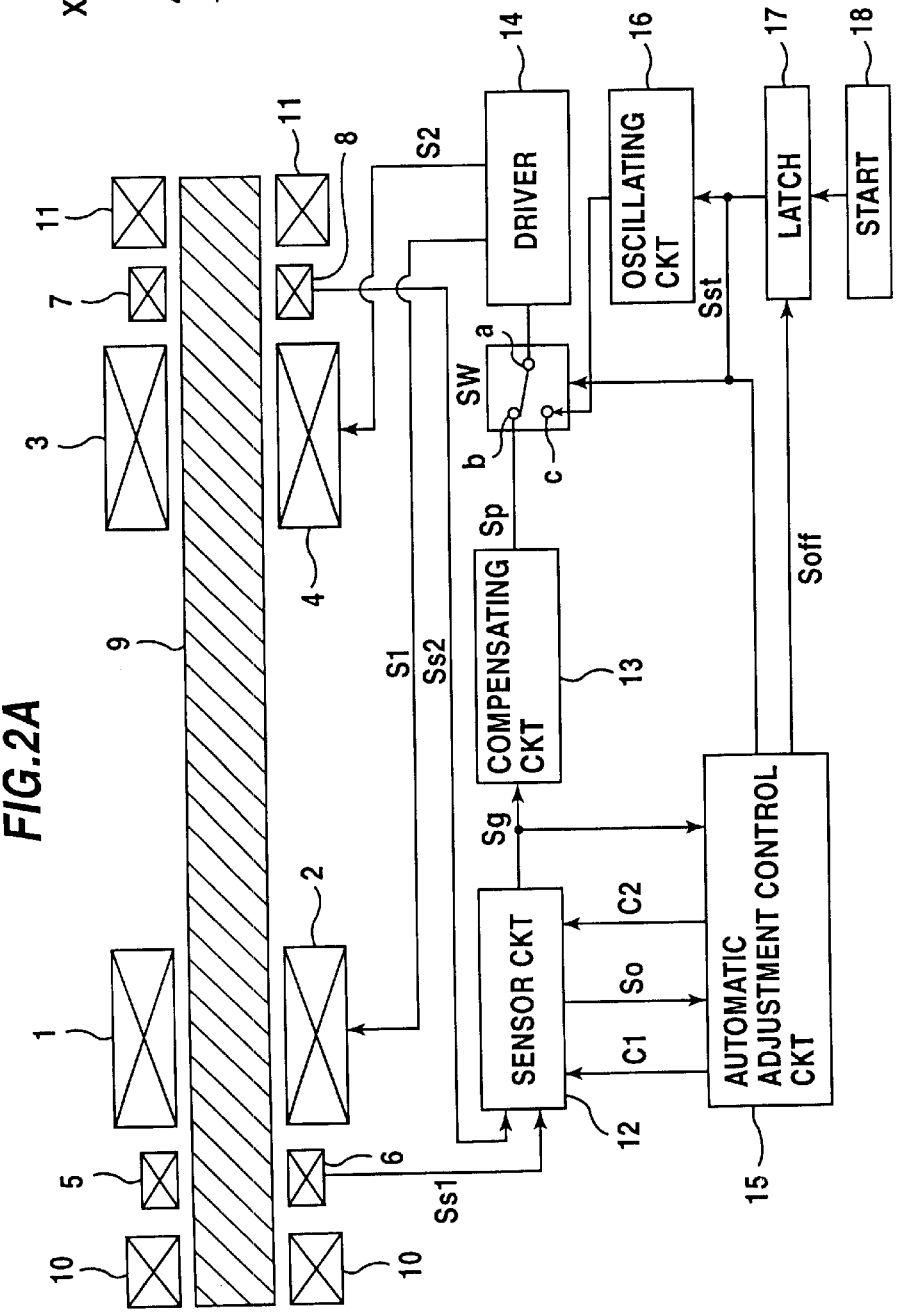

MAGNETIC BEARING DEVICE

BACKGROUND OF THE INVENTION

1. Field of the Invention

The present invention relates to a magnetic bearing device for levitating an object in an arbitrary position out of contact with electromagnets under magnetic attractive or repulsive forces generated by the electromagnets.

2. Description of the Related Art

FIG. 1 of the accompanying drawings shows a conventional magnetic bearing device. As shown in FIG. 1, the conventional magnetic bearing device comprises a magnetizable object 105 to be levitated, a pair of electromagnets 101, 102 for generating magnetic forces to levitate and support the object 105, and a pair of positional displacement sensors 103, 104 for detecting a positional displacement of the object 105. The object 105 is disposed between the electromagnets 101, 102 and also between the positional displacement sensors 103, 104.

The object 105 is subject to electromagnetic attractive or repulsive forces generated by the electromagnets 101, 102. The electromagnetic attractive or repulsive forces generated by the electromagnets 101, 102 are compensated for by a control circuit based on a detected positional displacement signal produced by the positional displacement sensors 103, 104. The object 105 is levitated and supplied under the electromagnetic attractive or repulsive forces generated by the electromagnets 101, 102.

The control circuit 111 comprises a sensor circuit 110, a compensating circuit 108, and a driver 109. The sensor circuit 110 comprises an offset corrector 106 and a sensor gain adjuster 107.

The detected positional displacement signal produced by the positional displacement sensors 103, 104 is compared with a threshold level preset in the sensor circuit 110, and a differential signal is compensated for by the compensating circuit 108 to control the driver 109 to apply drive signals to the electromagnets 101, 102 so as to levitate and support the object 105 in a desired position between the electromagnets 101, 102.

The threshold level is preset so as to be substantially equal to the detected positional displacement signal produced by the positional displacement sensors 103, 104 when the object 105 is positioned at the center of a levitation range between the electromagnets 101, 102. The driver 109 energizes the electromagnets 101, 102 to levitate and support the object 105 so as to minimize the differential signal between the threshold level and the detected positional displacement signal.

In order to preset the threshold level, it has heretofore been customary to manually move the object 105 or move the object 105 under magnetic forces from the electromagnets 101, 102, in a mechanically movable maximum range between the electromagnets 101, 102. The offset corrector 106 calculates a middle value of the detected positional displacement signal from maximum and minimum values of the detected positional displacement signal which are produced by the positional displacement sensors 103, 104 when the object 105 is thus moved. The calculated middle value is used as the threshold level or zero point.

If the magnetic bearing device is very large or very long or if the object 105 to be levitated cannot be touched, then it is practically impossible to move the object 105 manually in the mechanically movable maximum range between the electromagnets 101, 102.

Adjusting the levitated position of the object 105 under magnetic forces produced by the electromagnets 101, 102 also needs special care. Specifically, if the positional displacement sensors 103, 104 have inaccurate output characteristics due to mechanical dimensional errors or individual variations of the positional displacement sensors 103, 104, or either the magnetic bearing mechanism or the control circuit 111 is replaced at the time of maintenance of the magnetic bearing device, then it is necessary to adjust the levitated position of the object 105 in the magnetic bearing mechanism with the control circuit 111 to be used in a new combination.

The magnetic bearing device has auxiliary supports (auxiliary bearings) for contacting and supporting the object 105 in case the object 105 is held at rest while being levitated or the levitation control process suffers a malfunction. If the auxiliary supports are damaged, broken or excessively worn to the extent that they fail to perform their own function, then such a failure cannot be detected while the magnetic bearing mechanism remains assembled.

SUMMARY OF THE INVENTION

It is therefore an object of the present invention to provide a magnetic bearing device which makes it easy to adjust a preset level for the levitated position of an object to be levitated and which is capable of easily detecting deformation or wear of an auxiliary support for the object to be levitated.

To achieve the above object, there is provided a magnetic bearing device comprising a pair of electromagnets, a magnetizable object to be levitated which is disposed between the electromagnets, a pair of positional displacement sensors for detecting a positional displacement of the object, and a control circuit responsive to a detected positional displacement signal from the positional displacement sensors, for outputting a control current to control magnetic attractive or repulsive forces produced by the electromagnets to levitate the object in an arbitrary position between the electromagnets out of contact therewith, the control circuit comprising offset correcting means for producing an offset-corrected signal from the detected positional displacement signal from the positional displacement sensors, position compensating means for compensating for the offset-corrected signal from the offset correcting means, a driver responsive to a compensated signal from the position compensating means for applying a drive signal to energize the electromagnets, control means for controlling the driver to successively energize the electromagnets to move the object in a mechanically movable maximum range between the electromagnets, detecting maximum and minimum values of the detected positional displacement signal from the positional displacement sensors, calculating a middle value between the maximum and minimum values, and comparing the middle value with a predetermined threshold level, and output adjusting means for adjusting the offset-corrected signal from the offset correcting means to substantially eliminate the difference between the middle value and the threshold level so that the middle value represents a position in which the object is to be levitated between the electromagnets.

The control circuit may further comprise means for selectively entering a manual or automatic setting process command to perform a process of controlling said control means to control said driver to successively energize said electromagnets to move said object in a mechanically movable maximum range between said electromagnets, detect maximum and minimum values of the detected positional displacement signal, calculate the middle value between said maximum and minimum values, and compare said middle value with a predetermined threshold level, and said output adjusting means to adjust the offset-corrected signal to substantially eliminate the difference between said middle value and said threshold level.

The magnetic bearing device may further comprise a pair of auxiliary supports for limiting a movable range of the object, and the control circuit may further comprise means for monitoring a change in the maximum and minimum values of the detected positional displacement signal when the object is moved in the mechanically movable maximum range between the electromagnets, thereby to detect when the auxiliary supports suffer a failure.

By successively energizing the electromagnets, the object is moved in the mechanically movable maximum range between the electromagnets. At this time, maximum and minimum values of the detected positional displacement signal from the positional displacement sensors are detected, and a middle value between the maximum and minimum values is calculated and compared with a threshold level to determine a position in which the object is to be levitated. An adjustment signal is applied to the offset correcting means to substantially eliminate the difference between the middle value and the threshold level. With this arrangement, it is possible to levitate and support the object in a desired position even if the magnetic bearing device is very large or very long or if the object to be levitated cannot be touched.

Even if the positional displacement sensors have inaccurate output characteristics due to mechanical dimensional errors or individual variations of the positional displacement sensors, or individual components of the magnetic bearing mechanism and the control circuit need to be replaced, the positional displacement sensors can be adjusted in a reduced period of time, and any burden imposed on the operator for such an adjustment is reduced.

It is also possible to detect when the auxiliary supports are damaged, broken or excessively worn based on a maximum change in the detected positional displacement signals while in the above process of determining the target levitated position of the object.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2A is a view, partly in block form, of a magnetic bearing device according to the present invention;

FIG. 2B is a diagram showing the layout of electromagnets in X- and Y-axis directions of the magnetic bearing device;

DETAILED DESCRIPTION OF THE PREFERRED EMBODIMENT

As shown in FIG. 2A, a magnetic bearing device according to the present invention comprises two pairs of confronting electromagnets 1, 2, 3, 4 for levitating and supporting a magnetizable object 9 to be levitated which is disposed between the confronting electromagnets, two pairs of positional displacement sensors 5, 6, 7, 8 for detecting a positional displacement of the object 9, and two pairs of auxiliary supports (auxiliary bearings) 10, 11 for supporting the object 9 when the object 9 is not levitated by the electromagnets 1, 2, 3, 4. The electromagnets 1, 2, 3, 4, the positional displacement sensors 5, 6, 7, 8, and the auxiliary supports 10, 11 jointly make up a magnetic bearing mechanism.

Figure 1:
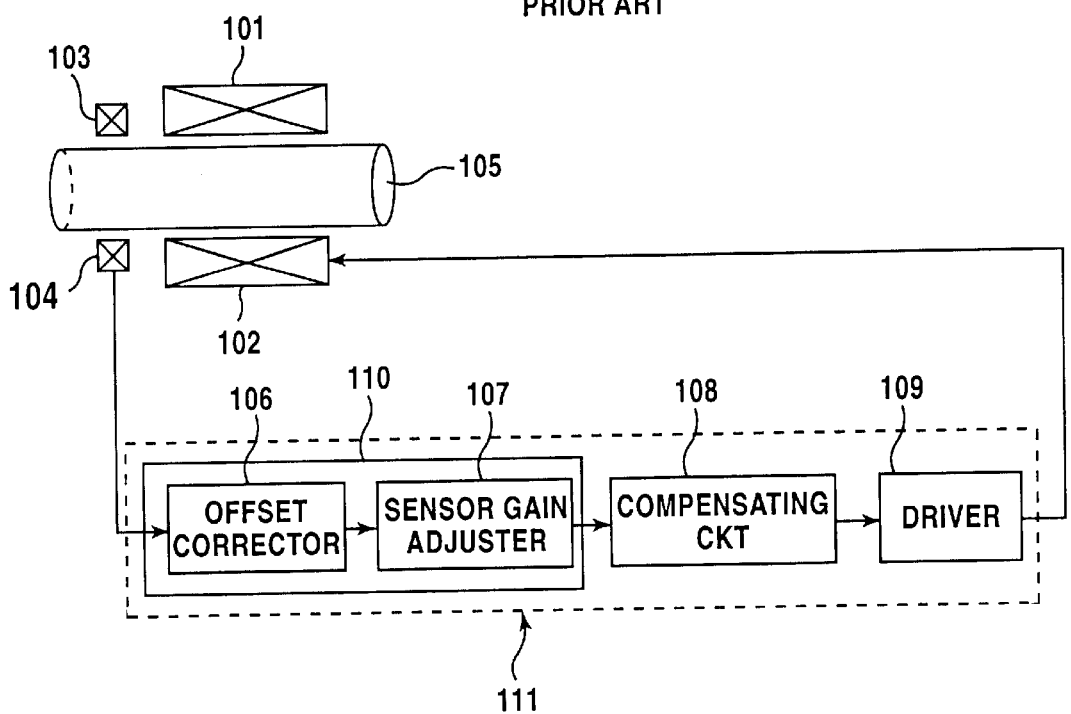
FIG. 1 is a view, partly in block form, of a conventional magnetic bearing device.
Figure 3:
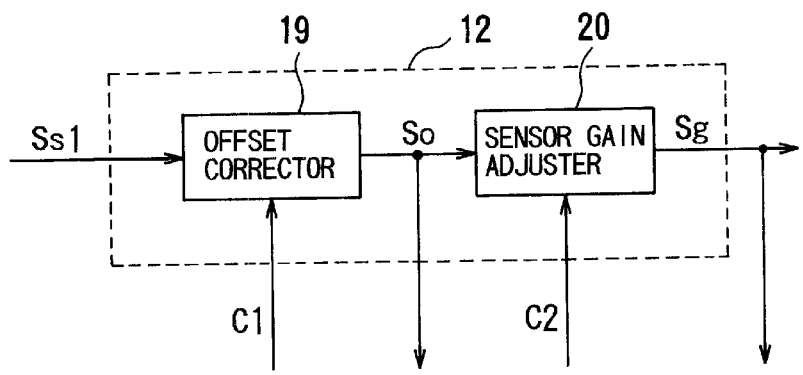
FIG. 3 is a detailed block diagram of a sensor circuit of the magnetic bearing device shown in FIG. 2A.

A detected positional displacement signal Ss1 from the positional displacement sensors 5, 6 and a detected positional displacement signal Ss2 from the positional displacement sensors 7, 8 are applied to a sensor circuit 12. As shown in FIG. 3, the sensor circuit 12 comprises an offset corrector 19 and a sensor gain adjuster 20. For the sake of brevity, only the circuit arrangement of the sensor circuit 12 for processing the detected positional displacement signal Ss1 from the positional displacement sensors 5, 6 is illustrated in FIG. 3. The offset corrector 19 and the sensor gain adjuster 20 output a corrected displacement sensor output signal Sg to a compensating circuit 13, which outputs a compensated signal Sp. The compensated signal Sp is applied to a driver 14 that supply corresponding currents to the electromagnets 1, 2, 3, 4. The electromagnets 1, 2, 3, 4 produce electromagnetic attractive or repulsive forces to levitate the object 9 stably. In this manner, the levitation of the object 9 is controlled through a feed-back loop.

A levitated position adjustment process, i.e., a process of adjusting the levitated position of the object 9 is performed while the object 9 is not levitated, the compensating circuit 13 and the driver 14 are disconnected to each other by a switch SW, and an oscillating circuit 16 is connected to the driver 14 by the switch SW. In the adjusting process, a dummy signal is applied from the oscillating circuit 16 to the driver 14 to enable the electromagnets 1, 2, 3, 4 to generate electromagnetic forces that are large enough to bring the object 9 into contact with the auxiliary supports 10, 11.

Figure 4:
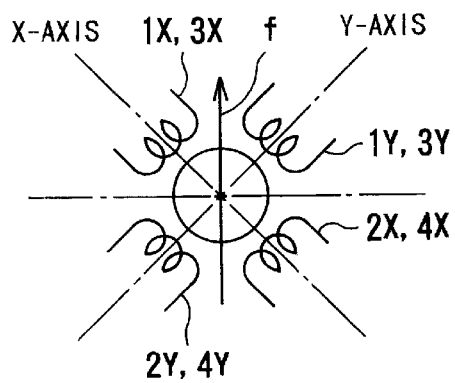
FIG. 4 is a diagram showing an electromagnetic force vector acting on an object to be levitated under electromagnetic attractive or repulsive forces.

When the dummy signal is applied from the oscillating circuit 16 to the driver 14, the driver 14 applies a sine-wave signal to electromagnetic coils 1X, 3X, 2X, 4X of the electromagnets 1, 3, 2, 4 that are disposed on an X-axis and also applies a signal which leads or lags the sine-wave signal by 90° to electromagnetic coils 1Y, 3Y, 2Y, 4Y of the electromagnets 1, 3, 2, 4 that are disposed on a Y-axis. At this time, a vector f (see FIG. 4) of electromagnetic forces generated by the electromagnets 1, 3, 2, 4 and acting on the object 9 revolves in the magnetic bearing mechanism at a constant period corresponding to the frequency of the sine-wave signals, thereby moving the object 9 along the auxiliary supports 10, 11.

During this time, an offset-corrected output signal produced by the offset corrector 19 is detected by an automatic adjustment control circuit 15, which then outputs an offset adjustment command C1 for equalizing the absolute values of maximum and minimum values of the detected positional displacement signals with each other to the offset corrector 19 for thereby aligning a target levitated position of the object 9 with the center of the auxiliary supports 10, 11. This process will be referred to as an offset correction process.

Then, a gain-adjusted output signal Sg from the sensor gain adjuster 20 is detected by the automatic adjustment control circuit 15, which outputs a gain adjustment command C2 for setting the absolute value of the gain-adjusted output signal Sg to a predetermined magnitude to the sensor gain adjuster 20 for thereby achieving a preset sensor sensitivity. This process will be referred to as a sensor gain adjustment process.

After the offset correction process and the sensor gain adjustment process, the automatic adjustment control circuit 15 adds an arbitrary value to or subtracts an arbitrary value from the offset adjustment command C1, and the resultant command to the offset corrector 19 for thereby levitating the object 9 to an arbitrary target levitated position. This process is referred to as the levitated position adjustment process.

The levitated position adjustment process is automatized as follows: An adjustment start button 18 outputs a sensor adjustment start signal Sst to a latch 17, which holds the sensor adjustment start signal Sst and outputs it to the switch SW, the oscillating circuit 16, and the automatic adjustment control circuit 15. The switch SW connects its contacts a, c to each other, and the oscillating circuit 16 outputs a sine-wave signal and a signal which leads or lags the sine-wave signal by 90° via the switch SW to the driver 14. The automatic adjustment control circuit 15 now starts the levitated position adjustment process.

Figure 5:
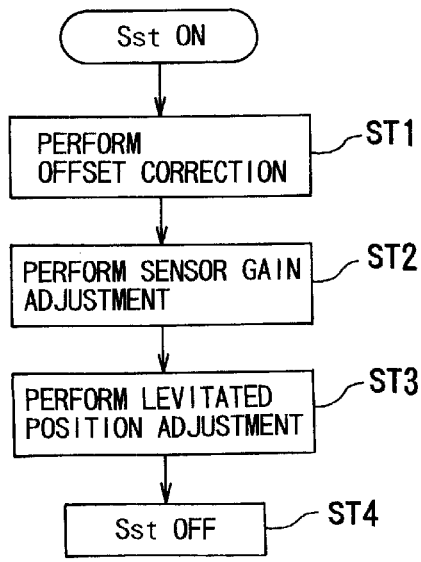
FIG. 5 is a flowchart of an automatic adjustment control sequence of an automatic adjustment control circuit of the magnetic bearing device shown in FIG. 2A.

FIG. 5 is a flowchart of an automatic adjustment control sequence of the automatic adjustment control circuit 15. As shown in FIG. 5, when the sensor adjustment start signal Sst is turned on, the offset adjustment process is performed in step ST1. Then, the sensor gain adjustment process is carried out in step ST2. Thereafter, the levitated position adjustment process is performed in step ST3. Finally, the sensor adjustment start signal Sst is turned off.

When the sensor gain adjustment process is finished, the automatic adjustment control circuit 15 outputs a sensor adjustment stop signal Soff to the latch 17 to turn off the sensor adjustment start signal Sst. The oscillating circuit 16 is now disabled, and the switch SW connects contacts a, b to each other. The magnetic bearing device now starts controlling the levitation of the object 9.

The movable range of the object 9 that is obtained in the levitated position adjustment process is limited to inner dimensions of the auxiliary supports 10, 11. Therefore, the maximum value of the detected positional displacement signals represents the inner dimensions of the auxiliary supports 10, 11.

If the auxiliary supports 10, 11 which support the object 9 while the object 9 is not magnetically levitated by the magnetic bearing device are damaged, broken or excessively worn, then the detected positional displacement signals produced by the positional displacement sensors 5, 6, 7, 8 change from the maximum value thereof which is produced when the auxiliary supports 10, 11 are normal. If the change of the detected positional displacement signals exceeds a predetermined allowable range, then an alarm is issued to indicate that the auxiliary supports 10, 11 suffer a failure.

As described above, the object 9 is mechanically moved in the range in which it can be moved by the electromagnets 1, 2, 3, 4. Based on maximum and minimum values of the detected positional displacement signals produced by the electromagnets 1, 2, 3, 4, the process of determining a target levitated position of the object 9 is carried out according to an automatic or manual setting process command. The magnetic bearing device can thus be initialized automatically. It is also possible to detect when the auxiliary supports 10, 11 are damaged, broken or excessively worn based on a maximum change in the detected positional displacement signals while in the above process of determining the target levitated position of the object 9.

Although a certain preferred embodiment of the present invention has been shown and described in detail, it should be understood that various changes and modifications may be made therein without departing from the scope of the appended claims.

What is claimed is:

1. A magnetic bearing device comprising:

at least two pairs of electromagnets, one pair of said electromagnets being disposed on an X-axis, and another pair of said electromagnets being disposed on a Y-axis;

a magnetizable object to be levitated which is disposed between said electromagnets;

auxiliary supports for limiting a movable range of said object;

a pair of positional displacement sensors for detecting a positional displacement of said object; and a control circuit responsive to a detected positional displacement signal from said positional displacement sensors, for outputting a control current to control magnetic attractive or repulsive forces produced by said electromagnets to levitate said object in an arbitrary position between said electromagnets out of contact therewith;

said control circuit comprising:

object moving means for moving an object by applying sine-wave signals to the electromagnets, wherein a sine-wave signal is applied to the electromagnets of the X-axis and another sine-wave signal which leads or lags the first sine-wave signal by 90° is applied to the electromagnets of the Y-axis so that the object moves along the auxiliary supports at a constant period corresponding to a frequency of the sine-wave signals;

offset correcting means for producing an offset-corrected signal from the detected positional displacement signal from said positional displacement sensors;

position compensating means for compensating for the offset-corrected signal from said offset correcting means;

a driver responsive to a compensated signal from said position compensating means for applying a drive signal to energize said electromagnets;

control means for controlling said driver to successively energize said electromagnets to move said object along said auxiliary supports, detecting maximum and minimum values of the detected positional replacement signal from said positional displacement sensors, calculating a middle value between said maximum and minimum values, and comparing said middle value with a predetermined threshold level; and output adjusting means for adjusting the offset-corrected signal from said offset correcting means to substantially eliminate the difference between said middle value and said threshold level so that said middle value represents a position in which said object is to be levitated between said electromagnets.

2. A magnetic bearing device according to claim 1, wherein said control circuit further comprises means for selectively entering a manual or automatic setting process command to perform a process of controlling said control means to control said driver to successively energize said electromagnets to move said object in a mechanically movable maximum range between said electromagnets, detect maximum and minimum values of the detected positional displacement signal, calculate the middle value between said maximum and minimum values, and compare said middle value with a predetermined threshold level,and said output adjusting means to adjust the offset-corrected signal to substantially eliminate the difference between said middle value and said threshold level.

3. A magnetic bearing device according to claim 1, wherein said control circuit further comprises means for monitoring a change in the maximum and minimum values of the detected positional displacement signal when said object is moved in the mechanically movable maximum range between said electromagnets, thereby to detect when said auxiliary supports suffer a failure.

* * * * *